Sept. 8, 1959     I. K. WEISS     2,903,256
AIR SUSPENSION
Filed June 22, 1956
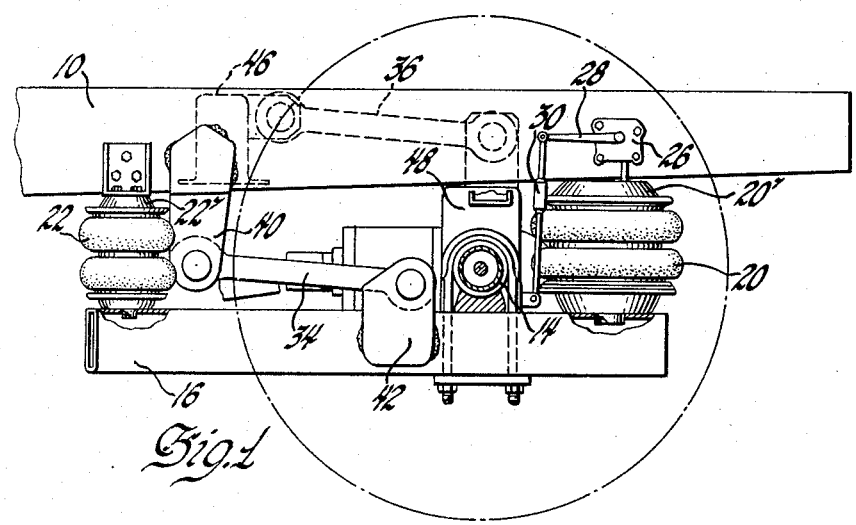
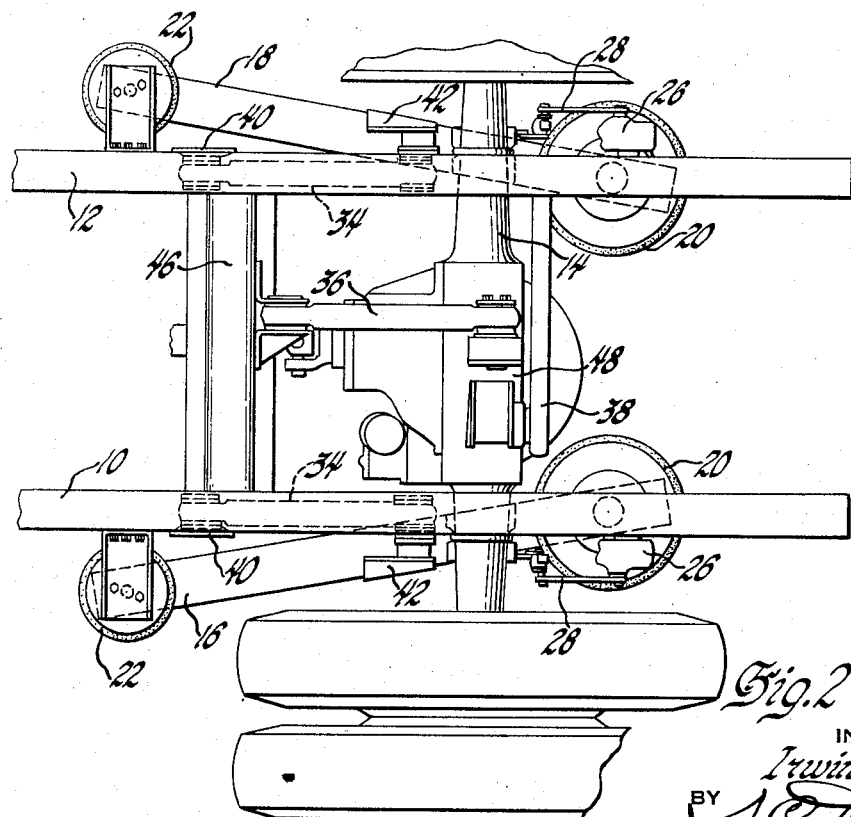
INVENTOR
Irwin K. Weiss
BY
ATTORNEY United States Patent Office 2,903,256
Patented Sept. 8, 1959

2,903,256

AIR SUSPENSION

Irwin K. Weiss, Birmingham, Mich., assignor to General Motors Corporation, Detroit, Mich., a corporation of Delaware Application June 22, 1956, Serial No. 593,229

7 Claims. (Cl. 267—15)

This invention concerns a pneumatic rear suspension particularly adapted for two axle vehicles in which the rear axle is the driving axle.

The principal object of the invention is to provide such a suspension which affords excellent riding qualities with good stability.

Another object is to provide a suspension system in which certain parts are multi-functional, the number of parts thus being held to a minimum.

Still another object is to provide a rear suspension which is adapted for use with a Hotchkiss drive, i.e. a drive which does not involve employment of a torque tube encasing the propeller shaft and taking braking and acceleration reactions.

A further object is to provide a suspension system wherein the parts are readily accessible for replacement or repair and which allows more freedom in the location of component parts as, for example, torque rods, shock absorbers and the like.

An additional object is to provide a rear suspension in which all the component parts are positioned in a protected location largely precluding damage thereto when the vehicle is backed into an obstacle as not infrequently happens in the case of trucks particularly.

Still other objects and features of the invention will be apparent from the following description of a preferred embodiment thereof. The description will proceed with reference to the accompanying drawings in which:

Figure 1 is a side elevation of a suspension system, with certain parts appearing in section or shown broken away; and Figure 2 is a plan of the suspension of Figure 1.

In the drawings, the numerals 10 and 12 denote the side rail components of the vehicle frame. Disposed therebelow and made fast to the driving axle 14 is a pair of beams 16, 18 mounting pneumatic springs 20 and 22. As should be clear, there is no relative motion between the axle and the beams.

Due to the asymmetrical mounting of the springs, with the larger springs 20 carried close to the axle, the greater portion of the load is borne by the latter springs. Both springs at either side are suitably fixed through header members 20', 22' to the corresponding frame side rail. The low rate spring 22 may be fabricated substantially as spring 20 except for size.

It is to be observed that while beams 16, 18 extend generally longitudinally of the vehicle there is substantial divergence thereof from rear to front. In this preferred embodiment, the springs 20 are located directly under the side rails, the springs 22 outwardly thereof. As a consequence of the wide spacing between the effective centers of the springs 22 excellent roll stability is assured.

Beams 16, 18 are made hollow and serve not only to undersupport the pneumatic springs but also as air reservoirs, the spring action being marked by exchange of air between the springs and beams.

The illustrated installation includes a levelling valve 26 associated with the springs at each side. These valves may be considered as conforming to the disclosure of Rossman Patent 2,670,201, granted February 23, 1954. Suffice it to say here that the housing portion of each valve has confined therewithin a member actuated through the arm 28 and operating to admit air to or exhaust air from the corresponding spring 20 to the end that the vehicle frame is maintained at a constant spacing with reference to the axle 14 irrespective of the load carried by the vehicle. Each arm 28 will be noted as connected to the axle 14 via an adjustable link 30.

As brought out in the identified prior patent, the valves 26 each comprise as an essential part a hydraulic dashpot which renders them incapable of operation from ordinary road shocks. Accordingly, except for leakage and pressure changes due to temperature variations, the valves normally function only when the vehicle is stationary, that is during loading and unloading of the vehicle.

While the valves 26 are shown in the instant drawings as being connected to the springs 20 it will be appreciated that they could just as well be connected to the beams 16, 18, the latter being in open communication at all times with the springs. The levelling valves are supplied with air through a tank, not shown, maintained at a predetermined pressure by a compressor normally powered by the engine of the vehicle. Each valve comprises a vent through which the springs exhaust on a reduction in the load.

In addition to the parts so far identified, the suspension includes longitudinal thrust rods 34 and 36 and a transverse thrust rod 38. Rods 34 are pivotally connected at their forward ends to the side rails of the frame, this connection being effected through brackets 40, and at their rear ends to the air beams, the latter connections being made through brackets 42. Rod 36, centrally disposed with reference to the rods 34, although at a higher level, pivotally connects to a frame cross member 46 and to the differential housing 48. Rod 38 also pivotally connects to the differential housing at its inner end, the outer end thereof making a pivotal connection with the side rail 18.

The torque rods, just described, are necessary since the air springs are capable of taking only vertical load. Acceleration and braking loads are borne by the rods 34 and 36, transverse loads by rod 38.

The invention having been thus described and illustrated what is claimed is:

1. In an automotive vehicle having a frame and a rear axle with a road wheel at either end thereof, a suspension comprising a pair of beams secured to said axle and extending generally longitudinally of the vehicle in spaced relation to said frame, each beam having a portion disposed rearwardly of the axle and a portion disposed forwardly thereof, the latter portion being of substantially greater length than the former, and a pneumatic spring seated on each said portion and connected to said frame, the spring seating on the shorter portion being positioned nearer the axle than the other spring, and having a higher rate carrying the bulk of the load.

2. A suspension conforming to claim 1 wherein said beams serve as air reservoirs for said springs.

3. In an automotive vehicle having a frame and a rear axle with a road wheel at either end thereof, a suspension comprising a pair of beams secured to said axle and extending generally longitudinally of the vehicle in spaced relation to said frame with substantial divergence from rear to front, each beam having a portion disposed rearwardly of the axle and a portion of substantially greater length disposed forwardly thereof, and a pneumatic spring seated on each said portion and connected to said frame, the spring seating on the shorter portion being substantially larger than the other spring and nearer the axle than the other spring, whereby the bulk of the load is carried thereby.

4. A suspension conforming to claim 3 wherein said beams serve as air reservoirs for said springs.

5. In an automotive vehicle having a frame comprising a pair of side rails and a rear axle with a road wheel at either end thereof, a suspension including a pair of beams secured to and carried below said axle and extending generally longitudinally of the vehicle in spaced relation to said frame with substantial divergence from rear to front, each beam having a portion disposed rearwardly of the axle and a portion of substantially greater length disposed forwardly thereof, and a pneumatic spring seated on each said portion and connected to the corresponding side rail, the spring seating on the shorter portion being substantially larger than the other spring and nearer the axle than the other spring the larger spring being positioned directly under the corresponding side rail, the said other spring being disposed outwardly of the said corresponding side rail and supporting less of the load.

6. A suspension conforming to claim 5 wherein said beams serve as air reservoirs for said springs, the operation of the suspension being marked by interchange of air between the springs and reservoirs.

7. A suspension conforming the claim 5 additionally comprising one or more thrust members taking braking and acceleration reactions and one or more such members taking transverse loads.

References Cited in the file of this patent

UNITED STATES PATENTS

| | | |
|---|---|---|
| 1,033,429 | Magner | July 23, 1912 |
| 1,446,759 | Mercier | Feb. 27, 1933 |
| 2,290,620 | Brown | July 21, 1942 |
| 2,378,097 | Piron | June 12, 1945 |
| 2,564,996 | Rasbach | Aug. 21, 1951 |
| 2,607,611 | Allison | Aug. 19, 1952 |
| 2,691,420 | Fox et al. | Oct. 12, 1954 |
| 2,713,498 | Brown | July 19, 1955 |
| 2,742,301 | Pointer | Apr. 17, 1956 |